US009840812B2

(12) United States Patent
Miller, IV et al.

(10) Patent No.: US 9,840,812 B2
(45) Date of Patent: Dec. 12, 2017

(54) TOWEL WITH QUALITY WET SCRUBBING PROPERTIES AT RELATIVELY LOW BASIS WEIGHT AND AN APPARATUS AND METHOD FOR PRODUCING SAME

(71) Applicant: First Quality Tissue, LLC, Great Neck, NY (US)

(72) Inventors: Byrd Tyler Miller, IV, Easley, SC (US); Justin S. Pence, Anderson, SC (US); Karthik Ramaratnam, Anderson, SC (US); James E. Sealey, Belton, SC (US); Courtney E. Kessling, Howard, PA (US); Chris B. Anklam, Anderson, SC (US); Shannon Gahan, Clemson, SC (US); Taras Z. Andrukh, Greenville, SC (US)

(73) Assignee: FIRST QUALITY TISSUE, LLC, Great Neck, NY (US)

( * ) Notice: Subject to any disclaimer, the term of this patent is extended or adjusted under 35 U.S.C. 154(b) by 0 days.

(21) Appl. No.: 15/634,865

(22) Filed: Jun. 27, 2017

(65) Prior Publication Data
US 2017/0292224 A1   Oct. 12, 2017

Related U.S. Application Data

(62) Division of application No. 14/561,802, filed on Dec. 5, 2014, now Pat. No. 9,719,213.

(51) Int. Cl.
*D21H 27/38* (2006.01)
*D21H 27/40* (2006.01)
(Continued)

(52) U.S. Cl.
CPC ............. *D21H 27/38* (2013.01); *D21H 11/04* (2013.01); *D21H 11/12* (2013.01); *D21H 21/20* (2013.01);
(Continued)

(58) Field of Classification Search
CPC ...... D21H 27/40; D21H 27/002; D21H 27/30; D21H 21/20; D21H 27/02; D21H 27/38;
(Continued)

(56) References Cited

U.S. PATENT DOCUMENTS

| 3,672,949 A * | 6/1972 | Brown ................... A47K 10/16 |
| | | 156/164 |
| 3,672,950 A * | 6/1972 | Murphy et al. .......... B31D 1/04 |
| | | 156/164 |

(Continued)

FOREIGN PATENT DOCUMENTS

| IT | EP 1911574 A1 * | 4/2008 | ................ B31F 1/07 |
| WO | WO 9606223 A1 * | 2/1996 | ............. D21F 11/04 |
| WO | 2007070145 A1 | 6/2007 | |
| WO | 2011028823 A1 | 3/2011 | |
| WO | 2014022848 A1 | 2/2014 | |
| WO | WO 2016090242 A1 * | 6/2016 | ............. D21H 23/56 |

OTHER PUBLICATIONS

International Search Report of PCT/US15/63986 dated Mar. 29, 2016.
(Continued)

*Primary Examiner* — Jose Fortuna
(74) *Attorney, Agent, or Firm* — Amster, Rothstein & Ebenstein LLP

(57) ABSTRACT

A method of making a multi-ply absorbent product having a wet scrubbing resistance greater than 120 revolutions and a basis weight of between 30 and 50 grams per square meter. A heated adhesive is applied between two single plies/webs, the multiple plies are embossed according to particular parameters, and the embossed webs are compressed with a marrying roll. The adhesive is heated to a temperature of between approximately 32° C. to 66° C. for application between the multiple plies. For each ply, the embossed area generally occupies between approximately 5 to 15% of the total surface area of a surface of the ply, the depth of embossment of the surface is generally between approxi-
(Continued)

mately 0.28 and 0.43 centimeters deep, and the embossment of the surface is generally between approximately 0.04 to 0.08 square centimeters in size.

17 Claims, 8 Drawing Sheets

(51) Int. Cl.

| | | |
|---|---|---|
| D21H 27/42 | (2006.01) | |
| D21H 11/04 | (2006.01) | |
| D21H 11/12 | (2006.01) | |
| D21H 21/20 | (2006.01) | |
| D21H 27/00 | (2006.01) | |
| D21H 27/02 | (2006.01) | |
| D21H 27/32 | (2006.01) | |

(52) U.S. Cl.
CPC ......... *D21H 27/002* (2013.01); *D21H 27/005* (2013.01); *D21H 27/02* (2013.01); *D21H 27/32* (2013.01)

(58) Field of Classification Search
CPC ...... D21H 27/007; D21H 11/12; D21H 13/08; D21H 27/42; B31F 1/07; B31F 2201/0787; Y10T 428/24612; Y10T 156/1023; B32B 2307/718; A47L 13/16
See application file for complete search history.

(56) References Cited

U.S. PATENT DOCUMENTS

| | | | | |
|---|---|---|---|---|
| 3,911,173 A | * | 10/1975 | Sprague, Jr. | A43D 25/183 12/142 R |
| 3,994,771 A | * | 11/1976 | Morgan, Jr. | D21F 11/006 162/113 |
| 4,075,382 A | * | 2/1978 | Chapman | A47K 10/16 156/219 |
| 4,098,632 A | * | 7/1978 | Sprague, Jr. | A43D 25/183 12/142 F |
| 4,102,737 A | * | 7/1978 | Morton | D21F 9/003 162/113 |
| 4,191,609 A | * | 3/1980 | Trokhan | D21F 11/006 162/113 |
| 4,507,351 A | * | 3/1985 | Johnson | B32B 5/26 156/291 |
| 4,529,480 A | * | 7/1985 | Trokhan | D21F 11/006 162/109 |
| 4,678,590 A | * | 7/1987 | Nakamura | D06M 13/152 424/70.19 |
| 4,770,920 A | * | 9/1988 | Larsonneur | B29C 65/605 156/209 |
| 4,885,202 A | * | 12/1989 | Lloyd | B32B 5/26 428/156 |
| 4,891,249 A | * | 1/1990 | McIntyre | B05B 7/0475 118/315 |
| 4,949,668 A | * | 8/1990 | Heindel | A61F 13/15642 118/314 |
| 4,996,091 A | * | 2/1991 | McIntyre | B05B 7/0815 428/113 |
| 5,059,282 A | * | 10/1991 | Ampulski | D21H 17/59 162/111 |
| 5,143,776 A | * | 9/1992 | Givens | B32B 7/14 428/194 |
| 5,405,501 A | * | 4/1995 | Phan | D21H 17/06 162/112 |
| 5,487,313 A | | 1/1996 | Johnson | |
| 5,510,002 A | * | 4/1996 | Hermans | D21F 11/006 162/111 |
| 5,529,665 A | * | 6/1996 | Kaun | D21H 17/59 162/111 |
| 5,581,906 A | | 12/1996 | Ensign et al. | |
| 5,607,551 A | * | 3/1997 | Farrington, Jr. | B32B 29/00 162/109 |
| 5,635,028 A | | 6/1997 | Vinson et al. | |
| 5,671,897 A | | 9/1997 | Ogg et al. | |
| 5,728,268 A | | 3/1998 | Weisman et al. | |
| 5,772,845 A | | 6/1998 | Farrington, Jr. et al. | |
| 5,827,384 A | | 10/1998 | Canfield et al. | |
| 5,832,962 A | * | 11/1998 | Kaufman | D21F 1/0027 139/383 A |
| 5,846,380 A | | 12/1998 | Van Phan et al. | |
| 5,855,738 A | | 1/1999 | Weisman et al. | |
| 5,858,554 A | * | 1/1999 | Neal | C09J 179/08 162/158 |
| 5,865,396 A | | 2/1999 | Ogg et al. | |
| 5,865,950 A | | 2/1999 | Vinson et al. | |
| 5,913,765 A | * | 6/1999 | Burgess | B31F 1/07 162/109 |
| 5,942,085 A | | 8/1999 | Neal et al. | |
| 5,944,954 A | | 8/1999 | Vinson et al. | |
| 5,980,691 A | | 11/1999 | Weisman et al. | |
| 6,036,139 A | | 3/2000 | Ogg | |
| 6,048,938 A | | 4/2000 | Neal et al. | |
| 6,106,670 A | | 8/2000 | Wesiman et al. | |
| 6,149,769 A | | 11/2000 | Mohammadi et al. | |
| 6,162,327 A | | 12/2000 | Batra et al. | |
| 6,162,329 A | | 12/2000 | Vinson et al. | |
| 6,187,138 B1 | | 2/2001 | Neal et al. | |
| 6,207,734 B1 | | 3/2001 | Vinson et al. | |
| 6,344,111 B1 | * | 2/2002 | Wilhelm | B31F 1/07 162/101 |
| 6,420,013 B1 | | 7/2002 | Vinson et al. | |
| 6,464,831 B1 | | 10/2002 | Trokhan et al. | |
| 6,547,928 B2 | | 4/2003 | Bamholtz et al. | |
| 6,551,453 B2 | | 4/2003 | Weisman et al. | |
| 6,572,722 B1 | | 6/2003 | Pratt | |
| 6,579,416 B1 | | 6/2003 | Vinson et al. | |
| 6,607,637 B1 | | 8/2003 | Vinson et al. | |
| 6,673,202 B2 | * | 1/2004 | Burazin | D21F 5/18 162/109 |
| 6,755,939 B2 | | 6/2004 | Vinson et al. | |
| 6,797,117 B1 | | 9/2004 | McKay et al. | |
| 6,808,599 B2 | * | 10/2004 | Burazin | D21F 5/18 162/109 |
| 6,821,386 B2 | | 11/2004 | Weisman et al. | |
| 6,821,391 B2 | * | 11/2004 | Scherb | D21F 1/32 162/111 |
| 6,827,818 B2 | | 12/2004 | Farrington, Jr. et al. | |
| 6,998,024 B2 | * | 2/2006 | Burazin | D21F 5/18 162/123 |
| 7,235,156 B2 | * | 6/2007 | Baggot | B31F 1/07 156/209 |
| 7,311,853 B2 | | 12/2007 | Vinson et al. | |
| 7,351,307 B2 | * | 4/2008 | Scherb | D21F 1/0036 162/115 |
| 7,387,706 B2 | * | 6/2008 | Herman | D21F 9/003 162/109 |
| 7,399,378 B2 | * | 7/2008 | Edwards | D21F 11/006 156/183 |
| 7,419,569 B2 | * | 9/2008 | Hermans | D21F 11/006 162/111 |
| 7,427,434 B2 | * | 9/2008 | Busam | D06C 23/04 428/182 |
| 7,431,801 B2 | | 10/2008 | Conn et al. | |
| 7,432,309 B2 | | 10/2008 | Vinson | |
| 7,442,278 B2 | * | 10/2008 | Murray | B31F 1/126 156/183 |
| 7,476,293 B2 | * | 1/2009 | Herman | D21F 5/182 162/205 |
| 7,494,563 B2 | * | 2/2009 | Edwards | D21F 11/006 162/109 |
| 7,510,631 B2 | * | 3/2009 | Scherb | D21F 5/182 100/118 |
| 7,563,344 B2 | * | 7/2009 | Beuther | D21F 11/006 162/109 |
| 7,582,187 B2 | * | 9/2009 | Scherb | D21F 11/14 162/109 |
| 7,622,020 B2 | * | 11/2009 | Awofeso | B31F 1/126 162/111 |
| 7,622,462 B2 | * | 11/2009 | Schoenfeld | C07D 403/04 514/213.01 |

(56) References Cited

U.S. PATENT DOCUMENTS

| | | | |
|---|---|---|---|
| 7,683,126 B2 | 3/2010 | Neal et al. | |
| 7,686,923 B2* | 3/2010 | Scherb | D21F 1/0036 162/358.1 |
| 7,687,140 B2 | 3/2010 | Manifold et al. | |
| 7,691,230 B2* | 4/2010 | Scherb | D21F 11/14 162/116 |
| 7,744,722 B1 | 6/2010 | Tucker et al. | |
| 7,744,726 B2* | 6/2010 | Scherb | D21F 1/0036 162/205 |
| 7,842,163 B2* | 11/2010 | Nickel | B31F 1/07 162/109 |
| 7,867,361 B2 | 1/2011 | Salaam et al. | |
| 7,871,692 B2* | 1/2011 | Morin | B31F 1/07 428/153 |
| 7,905,989 B2* | 3/2011 | Scherb | D21F 11/14 162/281 |
| 7,931,781 B2* | 4/2011 | Scherb | D21F 1/0036 162/206 |
| 7,951,269 B2* | 5/2011 | Herman | D21F 5/182 100/151 |
| 7,955,549 B2* | 6/2011 | Noda | B32B 3/30 264/154 |
| 7,972,475 B2 | 7/2011 | Chan et al. | |
| 7,989,058 B2 | 8/2011 | Manifold et al. | |
| 8,034,463 B2 | 10/2011 | Leimbach et al. | |
| 8,075,739 B2* | 12/2011 | Scherb | D21F 5/182 162/206 |
| 8,092,652 B2* | 1/2012 | Scherb | D21F 5/182 162/205 |
| 8,118,979 B2* | 2/2012 | Herman | D21F 5/182 162/205 |
| 8,147,649 B1 | 4/2012 | Tucker et al. | |
| 8,152,959 B2* | 4/2012 | Elony | B32B 29/00 156/209 |
| 8,196,314 B2* | 6/2012 | Munch | D21F 5/02 162/115 |
| 8,236,135 B2* | 8/2012 | Prodoehl | B32B 5/26 162/125 |
| 8,303,773 B2* | 11/2012 | Scherb | D21F 3/0209 162/198 |
| 8,382,956 B2* | 2/2013 | Boechat | D21F 3/0272 162/358.1 |
| 8,402,673 B2* | 3/2013 | Da Silva | D21F 5/182 162/206 |
| 8,409,404 B2* | 4/2013 | Harper | B32B 29/005 162/111 |
| 8,435,384 B2* | 5/2013 | Da Silva | D21F 3/0272 162/206 |
| 8,440,055 B2* | 5/2013 | Scherb | D21F 3/045 162/205 |
| 8,544,184 B2* | 10/2013 | Da Silva | D21F 5/182 162/358.1 |
| 8,574,211 B2* | 11/2013 | Morita | A61F 13/4902 442/328 |
| 8,580,083 B2* | 11/2013 | Boechat | D21F 3/0272 162/358.1 |
| 8,968,517 B2* | 3/2015 | Ramaratnam | D21H 27/008 162/127 |
| D734,617 S* | 7/2015 | Seitzinger | D5/57 |
| 9,095,477 B2* | 8/2015 | Yamaguchi | A61F 13/51104 |
| D738,633 S* | 9/2015 | Seitzinger | D5/56 |
| 9,382,666 B2* | 7/2016 | Ramaratnam | D21H 27/008 |
| 2001/0018068 A1* | 8/2001 | Lorenzi | A61K 8/0208 424/443 |
| 2002/0028230 A1* | 3/2002 | Eichhorn | A61K 8/0208 424/443 |
| 2002/0061386 A1* | 5/2002 | Carson | B32B 7/02 428/131 |
| 2003/0056917 A1 | 3/2003 | Jimenez | |
| 2003/0114071 A1* | 6/2003 | Everhart | D04H 1/49 442/414 |
| 2004/0118531 A1* | 6/2004 | Shannon | D21H 21/16 162/109 |
| 2004/0234804 A1* | 11/2004 | Liu | B05B 15/0208 428/537.5 |
| 2005/0112115 A1* | 5/2005 | Khan | A61K 9/2054 424/130.1 |
| 2005/0130536 A1* | 6/2005 | Siebers | A47L 13/16 442/327 |
| 2005/0148257 A1* | 7/2005 | Hermans | D21H 27/005 442/327 |
| 2005/0241788 A1* | 11/2005 | Baggot | B31F 1/07 162/117 |
| 2006/0013998 A1* | 1/2006 | Stelljes, Jr. | B31F 1/07 428/174 |
| 2006/0093788 A1* | 5/2006 | Behm | B32B 3/266 428/137 |
| 2006/0113049 A1* | 6/2006 | Knobloch | D21H 27/005 162/117 |
| 2006/0130986 A1* | 6/2006 | Flugge-Berendes | D21H 27/30 162/112 |
| 2007/0020315 A1* | 1/2007 | Shannon | D21H 27/30 424/443 |
| 2007/0137813 A1* | 6/2007 | Nickel | B31F 1/07 162/109 |
| 2007/0272381 A1* | 11/2007 | Elony | B32B 29/00 162/123 |
| 2008/0302493 A1* | 12/2008 | Boatman | B31F 1/07 162/109 |
| 2009/0020248 A1* | 1/2009 | Sumnicht | D21H 13/08 162/141 |
| 2009/0056892 A1 | 3/2009 | Rekoske | |
| 2009/0061709 A1* | 3/2009 | Nakai | B32B 27/12 442/170 |
| 2010/0224338 A1* | 9/2010 | Harper | B32B 29/005 162/132 |
| 2010/0239825 A1* | 9/2010 | Sheehan | D21H 27/005 428/172 |
| 2011/0027545 A1* | 2/2011 | Harlacher | D21H 21/28 428/195.1 |
| 2011/0206913 A1* | 8/2011 | Manifold | D21H 27/02 428/211.1 |
| 2011/0253329 A1 | 10/2011 | Manifold et al. | |
| 2012/0177888 A1* | 7/2012 | Escafere | B32B 5/26 428/162 |
| 2012/0244241 A1* | 9/2012 | McNeil | B31F 1/07 425/336 |
| 2013/0029105 A1* | 1/2013 | Miller | D21H 21/18 428/172 |
| 2013/0029106 A1* | 1/2013 | Lee | D21H 27/002 428/172 |
| 2013/0209749 A1* | 8/2013 | Myangiro | D21F 7/086 428/174 |
| 2013/0248129 A1* | 9/2013 | Manifold | D21H 27/005 162/109 |
| 2013/0327487 A1* | 12/2013 | Espinosa | D21H 27/002 162/109 |
| 2014/0041820 A1* | 2/2014 | Ramaratnam | D21H 27/008 162/127 |
| 2014/0242320 A1* | 8/2014 | McNeil | B32B 5/26 428/43 |
| 2015/0059995 A1* | 3/2015 | Ramaratnam | D21H 27/008 162/129 |
| 2015/0330029 A1* | 11/2015 | Ramaratnam | D21H 27/40 15/104.93 |
| 2016/0130762 A1* | 5/2016 | Ramaratnam | D21H 17/24 162/129 |
| 2016/0145810 A1* | 5/2016 | Miller, IV | D21H 27/005 162/111 |
| 2016/0160448 A1* | 6/2016 | Miller, IV | D21H 23/56 162/129 |
| 2017/0101741 A1* | 4/2017 | Sealey | B32B 7/12 |

OTHER PUBLICATIONS

Written Opinion of PCT/U515/63986 dated Mar. 29, 2016.

(56) References Cited

OTHER PUBLICATIONS

International Search Report of PCT/US13/53593 dated Dec. 30, 2013.
Written Opinion of PCT/U513/53593 dated Dec. 30, 2013.
International Preliminary Report on Patentability of PCT/US2013/05393 dated Feb. 3, 2015.
Supplementary European Search Report of EP 13 82 6461 Dated Apr. 1, 2016.
U.S. Appl. No. 61/679,337, filed Aug. 3, 2012.

* cited by examiner

TOWEL WITH QUALITY WET SCRUBBING PROPERTIES AT RELATIVELY LOW BASIS WEIGHT AND AN APPARATUS AND METHOD FOR PRODUCING SAME

RELATED APPLICATIONS

This application is a divisional of and claims priority to U.S. patent application Ser. No. 14/561,802, now U.S. Pat. No. 9,719,213, entitled TOWEL WITH QUALITY WET SCRUBBING PROPERTIES AT RELATIVELY LOW BASIS WEIGHT AND AN APPARATUS AND METHOD FOR PRODUCING SAME and filed Dec. 5, 2014, the contents of which are incorporated herein by reference in their entirety.

FIELD OF THE INVENTION

The present invention relates to absorbent products, such as paper towels, disposable towels or wipes, bath or facial tissues, or nonwoven products, having improved scrubbing properties at relatively low basis weights compared to conventional absorbent products.

BACKGROUND OF THE INVENTION

Across the globe there is great demand for disposable, absorbent products used for household cleaning tasks. Disposable towels and wipes meet this market demand. Disposable paper towels and wipes that are made of cellulosic based fibers are also nearly 100% renewable and biodegradable thus catering to those whom are eco-conscience. These disposable absorbent towels and wipes are used for a multitude of tasks that require absorbency and strength. These tasks include absorbing liquid spills, cleaning windows and mirrors, scrubbing countertops and floors, scrubbing and drying dishes, washing/cleaning bathroom sinks and toilets, and even drying/cleaning hands and faces. A disposable towel or wipe that can perform these demanding tasks and be produced at a price point that provides a value proposition to the consumer is advantageous.

To increase the strength of these absorbent products, more than one layer of web (or ply) can be laminated together. It is generally understood that a multi-ply absorbent product can also have an absorbent capacity greater than the sum of the absorbent capacities of the individual single plies. It is thought that this difference is due to the inter-ply storage space created by the addition of an extra ply. When producing a multi-ply absorbent product, the plies are bonded together in a manner that will hold up when subjected to the forces encountered when the product is used by the consumer. Scrubbing tasks such as cleaning countertops, dishes, and windows all impart forces upon the structure of the absorbent product which can cause the structure to rupture and tear. When the bonding between plies fails, the plies move against each other imparting frictional forces at the ply interface. This frictional force at the ply interface can induce failure (rupture or tearing) of the structure thus reducing the overall effectiveness of the product to perform scrubbing and cleaning tasks.

SUMMARY OF THE INVENTION

An object of the present invention is to provide a multi-ply absorbent product, such as a paper towel, a disposable towel or wipe, a bath or facial tissue, or a nonwoven product, that has a relatively high scrubbing resistance to tear or rupture during use of the product, as compared to conventional multi-ply absorbent products.

Another object of the present invention is to provide a method and apparatus for adhesively laminating single ply absorbent products to produce a multi-ply absorbent product that has a relatively high scrubbing resistance to tear or rupture during use, as compared to conventional multi-ply absorbent products.

Another object of the present invention is to achieve a multi-ply absorbent product that attains a high level of scrubbing performance at a relatively low basis weight, as compared to conventional multi-ply absorbent products.

To accomplish at least these objects, in some embodiments, an absorbent product comprises a laminate of at least two webs/plies of absorbent products that are embossed and adhered together to achieve a wet scrubbing resistance greater than 120 revolutions and a basis weight of between 30 and 50 grams per square meter of the laminate. In embodiments, one or more of the plies may be formed from cellulosic-based fibers or synthetic fibers, and may be formed with a wet-laid or an air-laid technology. The multi-ply absorbent product may be one of a paper towel, a disposable towel or wipe, a bath or facial tissue, or a nonwoven product.

Also, in some embodiments, an absorbent product comprises a laminate of at least two plies, wherein each of the at least two plies is embossed and the at least two plies are adhered together. At least one of the at least two plies comprises a first layer, a second layer, and a third layer located between said first and second layers, the absorbent product having a wet scrubbing resistance greater than 120 revolutions and a basis weight of between 30 and 50 grams per square meter.

In embodiments, a method for laminating the at least two plies together comprises embossing the at least two plies and applying a heated adhesive, such as a water soluble adhesive mixture, to an interior side of at least one of the at least two plies, wherein the interior side is a side of a ply that comes into face-to-face relationship with another ply for lamination, and marrying the at least two plies after the heated adhesive has been applied. This method achieves an absorbent product that is a laminate with a wet scrubbing resistance greater than 120 revolutions and a basis weight of between 30 and 50 grams per square meter of the laminate. In embodiments, the step of embossing is performed using embossing rolls having embossing knobs with crests. In embodiments, the heated adhesive is applied with an adhesive applicator roll to the absorbent product at the crests of the embossing knobs. In embodiments, the adhesive is maintained at a temperature of between approximately 32 degrees C. to 66 degrees C. The adhesive may be maintained at the desired temperature in an insulated tank that is heated and the adhesive may also be agitated while in the insulated tank.

In embodiments of the present invention, the water soluble adhesive mixture that is to be heated may comprise a mixture of (a) between approximately 1% to 10% by weight of polyvinyl alcohol, polyvinyl acetate, starch based resins or mixtures thereof, and (b) between 80% to 99% by weight of water, and, in embodiments, the mixture may further comprise (c) up to 10% by weight of a water soluble cationic resin selected from the group consisting of polyamide-epichlorohydrin resins, glyoxalated polyacrylamide resins, polyethyleneimine resins, polyethylenimine resins, or mixtures thereof.

Additionally, in some embodiments, each of the at least two plies comprises an embossed area, wherein the embossed area occupies between approximately 5 to 15% of the surface area, wherein a depth of embossment is between approximately 0.28 and 0.43 centimeters deep, and wherein each embossment is between approximately 0.04 to 0.08 square centimeters.

The present invention also discloses an apparatus for producing the laminate. In some embodiments, the apparatus comprises a plurality of embossing rolls, having a nip formed therebetween, that emboss the at least two plies of absorbent product. The apparatus further comprises an adhesive applicator roll, located upstream of the nip between the plurality of embossing rolls. The adhesive applicator roll applies an adhesive to an interior side of at least one of the embossed plies to adhere the at least two plies together, wherein the interior side is a side of a ply that comes into a face-to-face relationship with another ply for lamination. The apparatus further comprises a marrying roll, located downstream of the nip between the plurality of embossing rolls, that compresses the at least two plies of absorbent product that have been embossed and to which a heated adhesive has been applied so as to form a laminate of the at least two plies. Additionally, the apparatus comprises a heater for maintaining the adhesive at a temperature of between approximately 32 degrees C. to 66 degrees C. during application of the adhesive.

BRIEF DESCRIPTION OF THE DRAWINGS

Exemplary embodiments of the present invention will be described with references to the accompanying figures, wherein.

DETAILED DESCRIPTION OF THE PREFERRED EMBODIMENTS

Figure 1:
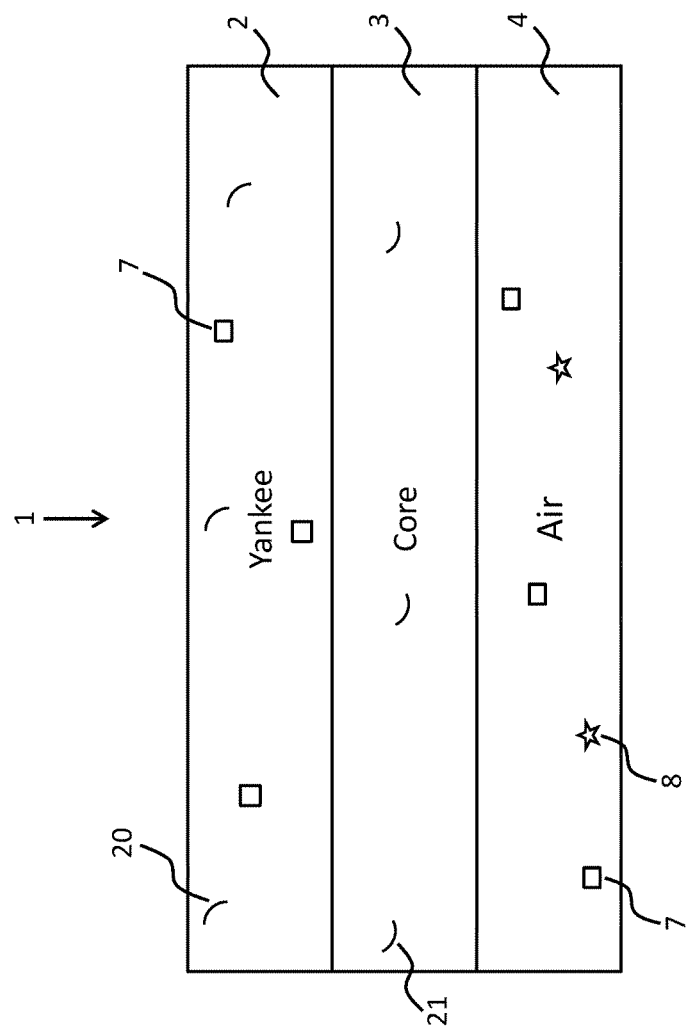
FIG. 1 is a schematic diagram of a three layer ply formed by a Wet Laid process for use in an exemplary embodiment of the present invention.

An absorbent product according to an exemplary embodiment of the present invention includes two or more plies of absorbent products/webs laminated together to achieve a wet scrubbing resistance greater than 120 revolutions and a basis weight of between 30 and 50 grams per square meter of the laminate. These levels of wet scrubbing resistance and relatively low basis weight are achieved by applying a heated, water soluble adhesive between the two or more plies, embossing the plies, and then using a marrying roll following the embossment. The present invention also discloses an apparatus and method for producing the laminate.

The absorbent products or structures that are used for each of the two or more webs/plies can be manufactured by any known or later-discovered wet-laid, air-laid or spun-laid methods. In the wet-laid method, water is used to form a web. In the air-laid method, air is used to form a web.

Examples of some known wet-laid technologies that may be used to form a cellulosic (or other natural or synthetic fiber type) web include Through Air Drying (TAD), Uncreped Through Air Drying (UCTAD), Conventional Wet Crepe (CWC), Conventional Dry Crepe (CDC), Advanced Tissue Molding System (ATMOS), NTT, and ETAD.

In Conventional Dry Crepe and Conventional Wet Crepe methods, a nascent web is formed in a forming structure, the web is transferred to a dewatering felt where it is pressed to remove moisture, and the web is then adhered to a Yankee Dryer. The web is then dried and creped from the Yankee Dryer and reeled. When creped at a solids content of less than 90%, the process is referred to as Conventional Wet Crepe. When creped at a solids content of greater than 90%, the process is referred to as Conventional Dry Crepe.

The CWC and CDC methods are easy to operate at high speeds and production rates. Energy consumption per ton is low since nearly half of the water removed from the web is through drainage and mechanical pressing. However, the sheet pressing also compacts the web which lowers web thickness and resulting absorbency.

The Through Air Drying (TAD) and Uncreped Through Air Drying (UCTAD) processes are wet-laid technologies that avoid compaction of the web during drying and thereby produce absorbent products of superior thickness and absorbency when compared to absorbent products of similar basis weight and material inputs that are produced using the CWC or the CDC process.

Other wet-laid processes, such as ATMOS, ETAD, and NTT, can also be utilized to produce absorbent products. Each process/method utilizes some pressing to dewater the web, or a portion of the web, resulting in absorbent products with absorbent capacities that correlate to the amount of pressing utilized when all other variables are the same.

Absorbent products may alternatively be made using an air-laid process. In this process, an air stream of cellulosic, or other natural or synthetic fibers, is directed onto a moving belt. The fibers collect together to form a web that can be thermally bonded or spray bonded with resin and cured. Compared to the wet-laid process, the web is thicker, softer, more absorbent, stronger and has a textile-like surface and drape.

The spun-laid process is a variation of the air-laid process. In the spun-laid process, plastic fibers (polyester or polypropylene) are spun (melted, extruded, and blown) and then directly spread into a web in one continuous process. This technique has gained popularity as it can generate faster belt speeds and reduce costs.

The materials used to produce the absorbent products can be fibers in any ratio selected from cellulosic-based fibers, such as wood pulps (softwood gymnosperms or hardwood angiosperms), cannabis, cotton, regenerated or spun cellulose, jute, flax, ramie, bagasse, kenaf, or other plant based cellulosic fiber sources. Synthetic fibers, such as a polyolefin (e.g., polypropylene), polyester, or polylactic acid can also be used. Each ply of a multi-ply absorbent product of the present invention may comprise cellulosic based fibers and/or synthetic fibers. Also, all the plies may be made of the same type(s) of fibers or different fibers may be used in some or all of the plies.

Figure 2:
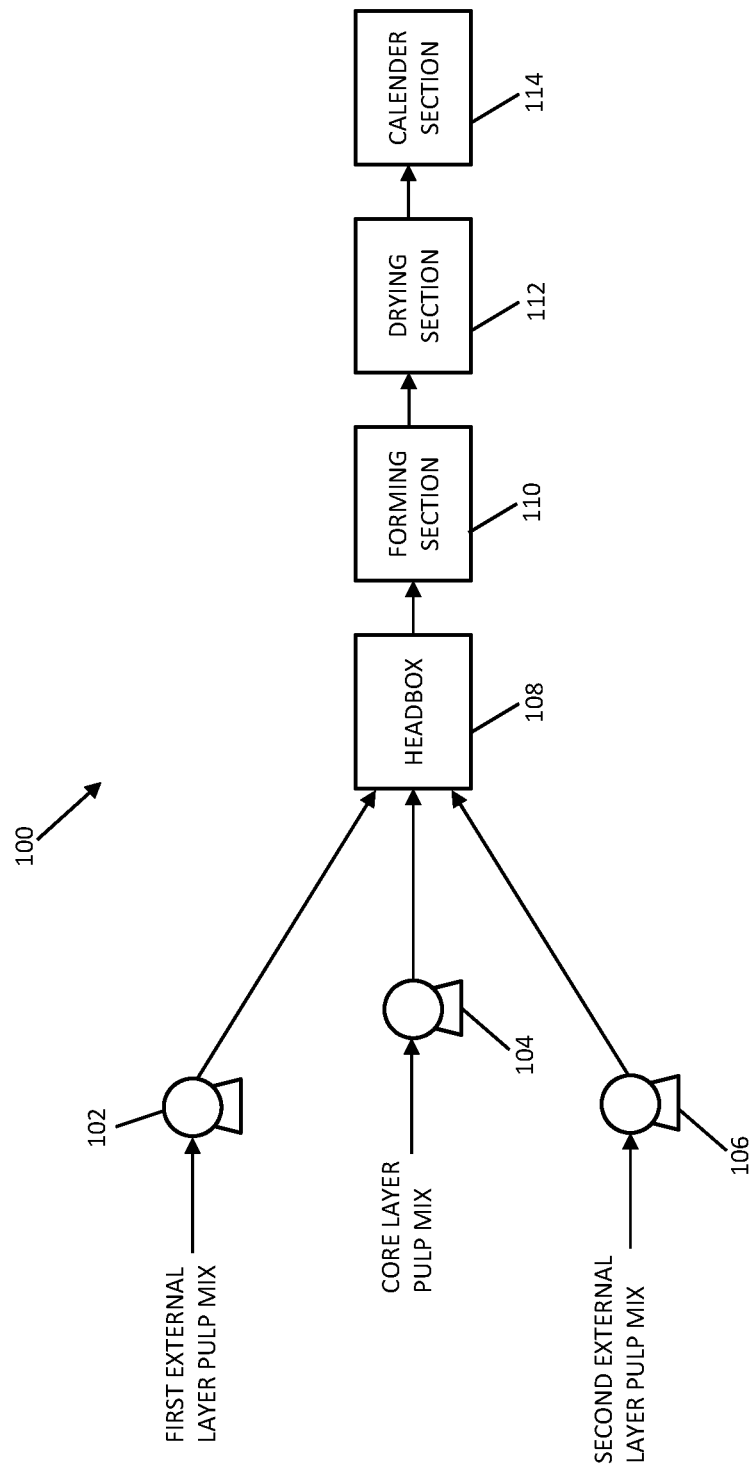
FIG. 2 is a block diagram of a system for manufacturing one ply of a laminate according to an exemplary embodiment of the present invention.

FIGS. 1 and 2 illustrate a single ply absorbent product and a method for manufacturing the tissue product in which a TAD drying method is used. The content of U.S. patent application Ser. No. 13/837,685, which describes such an absorbent, soft TAD tissue and is assigned to applicant, is incorporated herein by reference.

FIG. 1 shows an example of a single ply, three layer tissue generally designated by reference number 1 that has external (exterior) layers 2 and 4 as well as an internal (interior), core layer 3. In the figure, the three layers of the tissue from top to bottom are labeled as air 4, core 3 and dry (or Yankee) 2. External layer 2 is composed primarily of hardwood fibers 20 whereas external layer 4 and core layer 3 are composed of a combination of hardwood fibers 20 and softwood fibers 21. External layer 2 further includes a dry strength additive 7. External layer 4 further includes both a dry strength additive 7 and a temporary wet strength additive 8.

Pulp mixes for exterior layers of the tissue are prepared with a blend of primarily hardwood fibers. For example, the pulp mix for at least one exterior layer is a blend containing about 70 percent or greater hardwood fibers relative to the total percentage of fibers that make up the blend. As a further example, the pulp mix for at least one exterior layer is a blend containing about 90-100 percent hardwood fibers relative to the total percentage of fibers that make up the blend.

Pulp mixes for the interior layer of the tissue are prepared with a blend of primarily softwood fibers. For example, the pulp mix for the interior layer is a blend containing about 70 percent or greater softwood fibers relative to the total percentage of fibers that make up the blend. As a further example, the pulp mix for the interior layer is a blend containing about 90-100 percent softwood fibers relative to the total percentage of fibers that make up the blend.

As known in the art, pulp mixes are subjected to a dilution stage in which water is added to the mixes so as to form a slurry. After the dilution stage but prior to reaching the headbox, each of the pulp mixes are dewatered to obtain a thick stock of about 95% water. In an exemplary embodiment of the invention, wet end additives are introduced into the thick stock pulp mixes of at least the interior layer.

In an exemplary embodiment, a dry strength additive is added to the thick stock mix for at least one of the exterior layers. The dry strength additive may be, for example, amphoteric starch, added in a range of about 1 to 40 kg/ton. In another exemplary embodiment, a wet strength additive is added to the thick stock mix for at least one of the exterior layers. The wet strength additive may be, for example, glyoxalated polyacrylamide, commonly known as GPAM, added in a range of about 0.25 to 5 kg/ton. In a further exemplary embodiment, both a dry strength additive, preferably amphoteric starch and a wet strength additive, preferably GPAM are added to one of the exterior layers. Without being bound by theory, it is believed that the combination of both amphoteric starch and GPAM in a single layer when added as wet end additives provides a synergistic effect with regard to strength of the finished tissue. Other exemplary temporary wet-strength agents include aldehyde functionalized cationic starch, aldehyde functionalized polyacrylamides, acrolein co-polymers and cis-hydroxyl polysaccharide (guar gum and locust bean gum) used in combination with any of the above mentioned compounds.

In addition to amphoteric starch, suitable dry strength additives may include but are not limited to glyoxalated polyacrylamide, cationic starch, carboxy methyl cellulose, guar gum, locust bean gum, cationic polyacrylamide, polyvinyl alcohol, anionic polyacrylamide or a combination thereof.

FIG. 2 is a block diagram of a system for manufacturing such a three layer tissue, generally designated by reference number 100, according to an exemplary embodiment of the present invention. The system 100 includes a first exterior layer fan pump 102, a core layer fan pump 104, a second exterior layer fan pump 106, a headbox 108, a forming section 110, a drying section 112 and a calendar section 114. The first and second exterior layer fan pumps 102, 106 deliver the pulp mixes of the first and second external layers 2, 4 to the headbox 108, and the core layer fan pump 104 delivers the pulp mix of the core layer 3 to the headbox 108. As is known in the art, the headbox delivers a wet web of pulp onto a forming wire within the forming section 110. The wet web is then laid on the forming wire with the core layer 3 disposed between the first and second external layers 2, 4.

After formation in the forming section 110, the partially dewatered web is transferred to the drying section 112. Within the drying section 112, the tissue may be dried using conventional through air drying processes. In an exemplary embodiment, the tissue is dried to a humidity of about 7 to 20% using a through air drier manufactured by Metso Corporation, of Helsinki, Finland. In another exemplary embodiment, two or more through air drying stages are used in series. However, it should be emphasized that this is only one of various methods of manufacturing an absorbent tissue product to be used in manufacturing the laminate of the present invention.

In an exemplary embodiment, the tissue of the present invention is patterned during the through air drying process. Such patterning can be achieved through the use of a TAD fabric, such as a G-weave (Prolux 003) or M-weave (Prolux 005) TAD fabric.

After the through air drying stage, the tissue of the present invention may be further dried in a second phase using a Yankee drying drum. In an exemplary embodiment, a creping adhesive is applied to the drum prior to the tissue contacting the drum. A creping blade is then used to remove the tissue from the Yankee drying drum. The tissue may then be calendered in a subsequent stage within the calendar section 114. According to an exemplary embodiment, calendaring may be accomplished using a number of calendar rolls (not shown) that deliver a calendering pressure in the range of 0-100 pounds per linear inch (PLI). In general, increased calendering pressure is associated with reduced caliper and a smoother tissue surface.

According to an exemplary embodiment of the invention, a ceramic coated creping blade is used to remove the tissue from the Yankee drying drum. Ceramic coated creping blades result in reduced adhesive build up and aid in achieving higher run speeds. Without being bound by theory, it is believed that the ceramic coating of the creping blades provides a less adhesive surface than metal creping blades and is more resistant to edge wear that can lead to localized spots of adhesive accumulation. The ceramic creping blades allow for a greater amount of creping adhesive to be used which in turn provides improved sheet integrity and faster run speeds.

In addition to the use of wet end additives, the tissue of the present invention may also be treated with topical or surface deposited additives. Examples of surface deposited additives include softeners for increasing fiber softness and skin lotions. Examples of topical softeners include but are not limited to quaternary ammonium compounds, including, but not limited to, the dialkyldimethylammonium salts (e.g. ditallowdimethylammonium chloride, ditallowdimethylammonium methyl sulfate, di(hydrogenated tallow)dimethyl ammonium chloride, etc.). Another class of chemical softening agents include the well-known organo-reactive polydimethyl siloxane ingredients, including amino functional polydimethyl siloxane. zinc stearate, aluminum stearate, sodium stearate, calcium stearate, magnesium stearate, spermaceti, and steryl oil.

To enhance the strength and absorbency of these towels and wipes, multiple plies are laminated together using a heated adhesive, as described below with respect to FIG. 3. The adhesive mixture is water soluble and includes a mixture of one or more adhesives, one or more water soluble cationic resins and water. The one or more adhesives are present in an amount of 1% to 10% by weight and may be polyvinyl alcohol, polyvinyl acetate, starch based resins and/or mixtures thereof. A water soluble cationic resin may be present in an amount of up to 10% by weight and may include polyamide-epichlorohydrin resins, glyoxalated polyacrylamide resins, polyethyleneimine resins, polyethylenimine resins, and/or mixtures thereof. The remainder of the mixture is composed of water.

Figure 3:
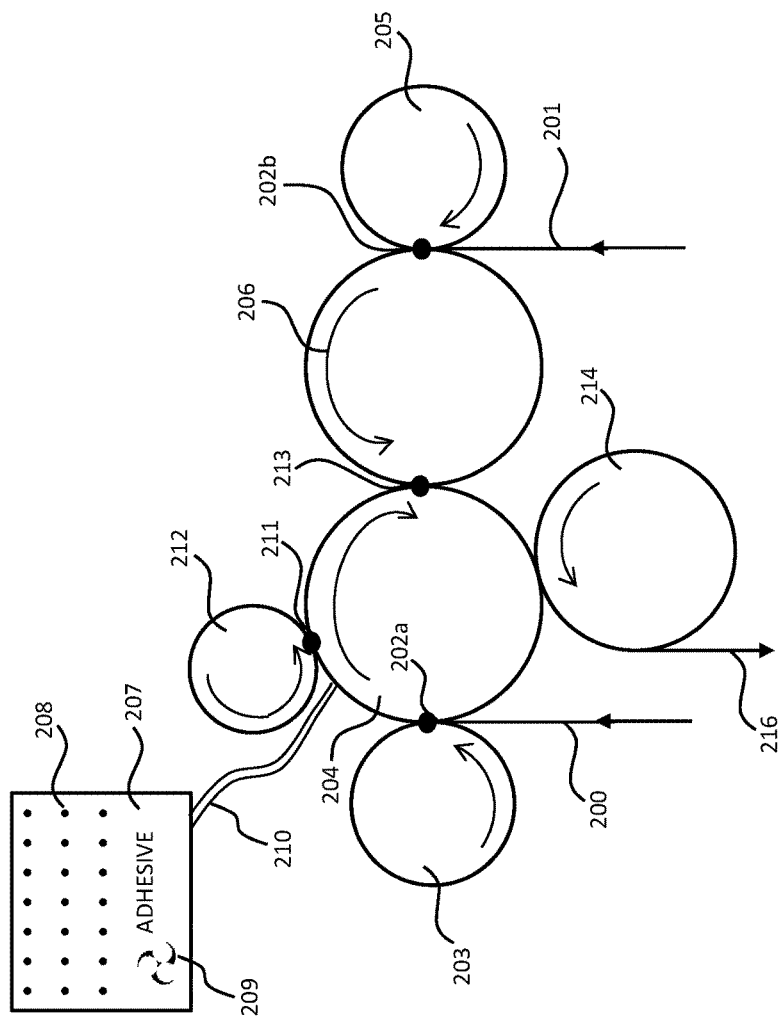
FIG. 3 is a block diagram of a system for manufacturing a multi-ply absorbent product according to an exemplary embodiment of the present invention.

FIG. 3 shows an apparatus for manufacturing a laminate of two plies of an absorbent product that are joined to each other, in a face-to-face relationship, in accordance with an exemplary embodiment of the present invention to form an absorbent product, such as a paper towel. As shown in the figure, two webs 200, 201 of single ply tissue, which may be manufactured, for example, according to a method described above, are fed to respective pairs of mated pressure rolls 203, 205 and substantially axially parallel embossing rolls 204, 206. A first web 200 is thus fed through a nip 202a formed by pressure roll 203 and embossing roll 204 (also known as a pattern roll) and a second web 201 is likewise fed through a nip 202b between pressure roll 205 and embossing roll 206. The embossing rolls 204, 206, which rotate in the illustrated directions, impress an embossment pattern onto the webs as they pass through nip 202a and 202b. After being embossed, each ply may have a plurality of embossments protruding outwardly from the plane of the ply towards the adjacent ply. The adjacent ply likewise may have opposing protuberances protruding towards the first ply. If a three ply product is produced by adding a third pair of mated pressure and embossing rolls, the central ply may have embossments extending outwardly in both directions.

To perform the embossments at nips 202a and 202b, the embossing rolls 204, 206 have embossing tips or embossing knobs that extend radially outward from the rolls to make the embossments. In the illustrated embodiment, embossing is performed by nested embossing in which the crests of the embossing knobs on one embossing roll intermesh with the embossing knobs on the opposing embossing roll and a nip is formed between the embossing rolls. As the web is fed through nips 202a and 202b, a pattern is produced on the surface of the web by the interconnectivity of the knobs on an embossing roll with the open spaces of the respective pressure roll.

An adhesive applicator roll 212 is positioned upstream of the nip 213 formed between the two embossing rolls and is aligned in an axially parallel arrangement with one of the two embossing rolls to form a nip therewith. The heated adhesive is fed from an adhesive tank 207 via a conduit 210 to applicator roll 212. The applicator roll 212 transfers heated adhesive to an interior side of embossed ply 200 to adhere the at least two plies 200, 201 together, wherein the interior side is the side of ply 200 that comes into a face-to-face relationship with ply 201 for lamination. The adhesive is applied to the ply at the crests of the embossing knobs 205 on embossing roll 204.

Notably, in the present invention, the adhesive is heated and maintained at a desired temperature utilizing, in embodiments, an adhesive tank 207, which is an insulated stainless steel tank that may have heating elements 208 that are substantially uniformly distributed throughout the interior heating surface. In this manner, a large amount of surface area may be heated relatively uniformly. Generally, an adjustable thermostat may be used to control the temperature of the adhesive tank 207. It has been found advantageous to maintain the temperature of the adhesive at between approximately 32 degrees C. (90 degrees F.) to 66 degrees C. (150 degrees F.), and preferably to around 49 degrees C. (120 degrees F.). In addition, in embodiments, the tank has an agitator 209 to ensure proper mixing and heat transfer.

The webs are then fed through the nip 213 where the embossing patterns on each embossing roll 204, 206 mesh with one another.

In nested embossing, the crests of the embossing knobs typically do not touch the perimeter of the opposing roll at the nip formed therebetween. Therefore, after the application of the embossments and the adhesive, a marrying roll 214 is used to apply pressure for lamination. The marrying roll 214 forms a nip with the same embossing roll 204 that forms the nip with the adhesive applicator roll 212, downstream of the nip formed between the two embossing rolls 204, 206. The marrying roll 214 is generally needed because the crests of the nested embossing knobs 205 typically do not touch the perimeter of the opposing roll 206 at the nip 213 formed therebetween.

The specific pattern that is embossed on the absorbent products is significant for achieving the enhanced scrubbing resistance of the present invention. In particular, it has been found that the embossed area on any ply should cover between approximately 5 to 15% of the surface area. Moreover, the size of each embossment should be between approximately 0.04 to 0.08 square centimeters. The depth of the embossment should be within the range of between approximately 0.28 and 0.43 centimeters (0.110 and 0.170 inches) in depth.

Figure 4:
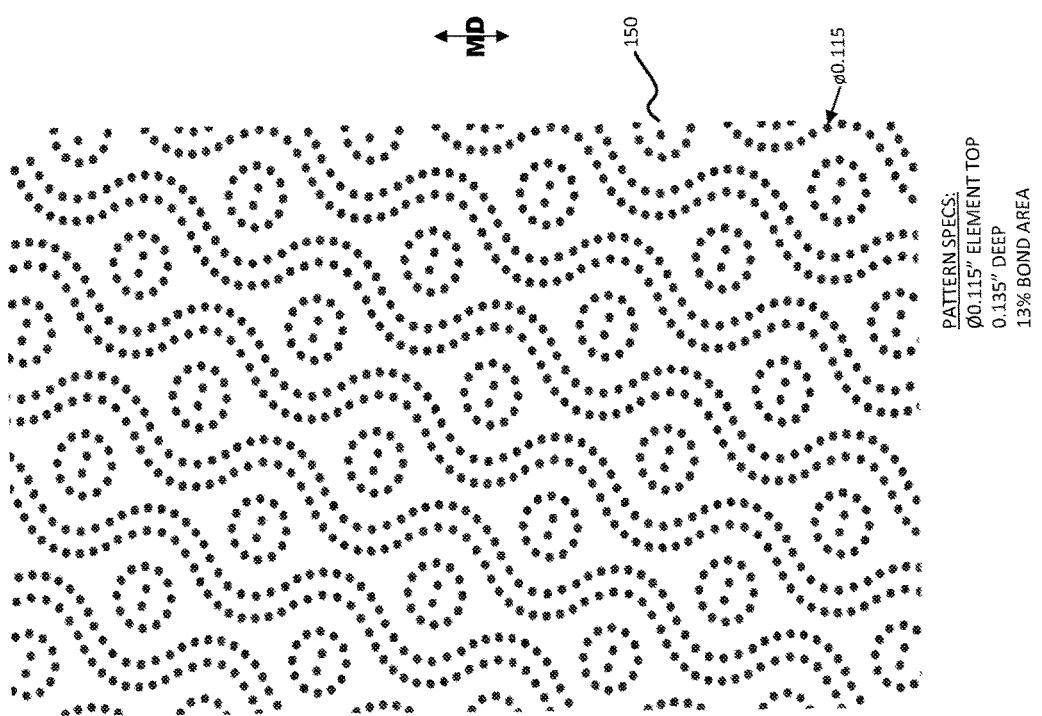
FIG. 4 shows an embodiment of an absorbent product that has an embossment pattern in accordance with an exemplary embodiment of the present invention.

FIG. 4 shows a sample pattern embossed on the absorbent product according to an embodiment of the present invention. In the illustrated pattern, the embossed area covers approximately 13% of the surface, the embossment depth is approximately 0.34 centimeters (0.135 inches) deep, and the embossment diameter is approximately 0.92 centimeters (0.115 inches) across.

The following discussion describes the tests that were used to determine the basis weights and wet scrubbing measurements in connection with the present invention.

Basis Weight

The basis weight for the present invention was measured in grams/m$^2$ using the following process. Using a dye and press, six approximately 76.2 mm by 76.2 mm (approximately 3 inch×3 inch) square samples were cut from each two-ply product that was tested with care taken to avoid including any web perforations in the samples. The samples were placed in an oven at 105 degrees Celsius for 5 minutes and were thereafter weighed on an analytical balance to the fourth decimal point. The weight of the sample in grams was then divided by $(0.0762 \text{ m})^2$ to determine the basis weight in grams/m$^2$.

Wet Scrubbing Test Method

A wet scrubbing test was used to measure the durability of a wet towel. The test involved scrubbing a sample wet towel with an abrasion tester and recording the number of revolutions of the tester it takes to break the sample. Multiple samples of the same product were tested and an average durability for that product was determined. The measured durability was then compared with similar durability measurements for other wet towel samples.

An abrasion tester was used for the wet scrubbing test. The particular abrasion tester that was used was an M235 Martindale Abrasion and Pilling Tester ("M235 tester") from SDL Atlas Textile Testing Solutions. The M235 tester provides multiple abrading tables on which the samples are abrasion tested and specimen holders that abrade the towel samples to enable multiple towel samples to be simultaneously tested. A motion plate is positioned above the abrading tables and moves the specimen holders proximate the abrasion tables to make the abrasions.

Figure 8:
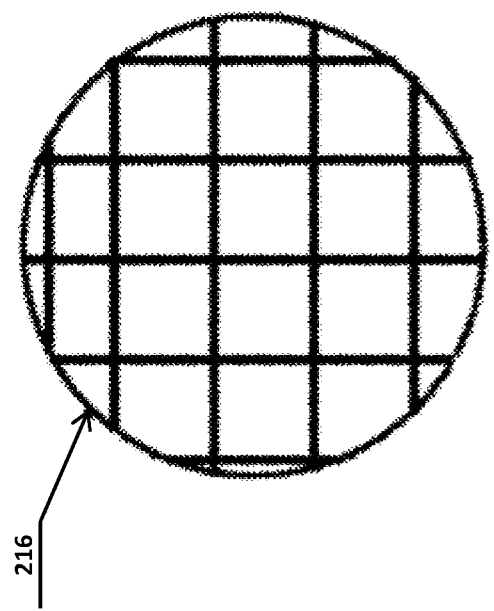
FIG. 8 shows a top view of the textured polymer film of FIG. 7.

In preparation for the test, eight (8) towel samples, approximately 140 mm (about 5.51 inches) in diameter, were cut. Additionally, four (4) pieces, also approximately 140 mm (approximately 5.51 inches) in diameter, were cut from an approximately 82±1 µm thick non-textured polymer film. The non-textured side of a Ziploc® Vacuum Sealer bag from Johnson & Johnson was used as the non-textured polymer film. However, any non-textured polymer film, such as high density polyethylene (HDPE), low density polyethylene (LDPE), polypropylene (PP), or polyester, to name a few, could be used. Additionally, four (4) 38 mm diameter circular pieces were cut from a textured polymer film with protruding passages on the surface to provide roughness. The textured polymer film that is used for this test is the textured side of a Ziploc® Vacuum Sealer bag from Johnson & Johnson. The textured film has a square-shaped pattern (FIG. 8). The thickness of the protruding passages of the textured polymer film that are used are approximately 213±5 µm and the thickness of the film in the valley region of the textured film between the protruding passages are approximately 131±5 µm. The samples were cut using respective 140 mm diameter and 38 mm cutting dies and a clicker press.

Figure 5:
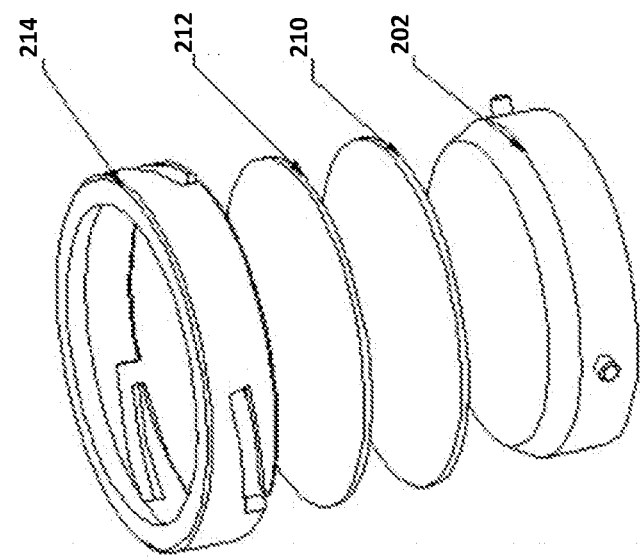
FIG. 5 is an exploded view of a towel sample mounted to an abrading table in accordance with an embodiment of the present invention.
Figure 6:
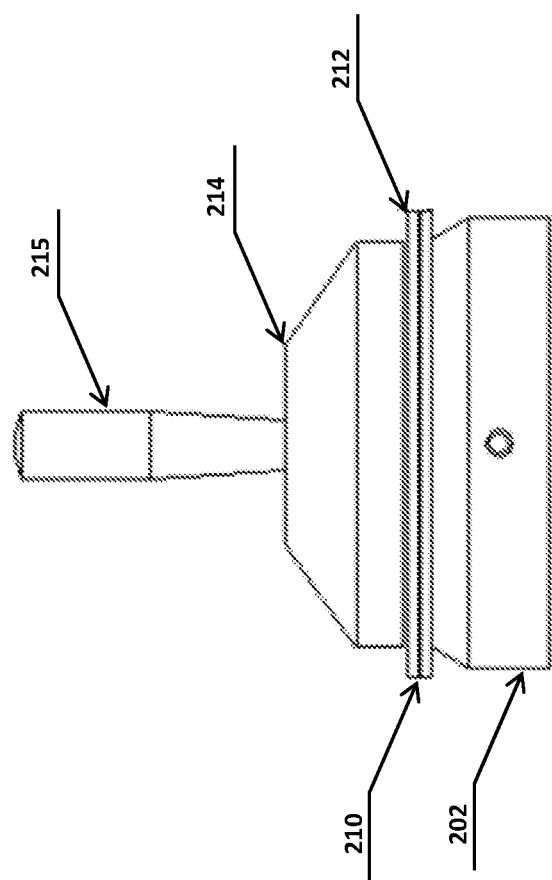
FIG. 6 is a side view of an abrading table with a towel sample attached thereto in accordance with an embodiment of the present invention.

An example of an abrading table used in conjunction with the M235 tester is shown in FIG. 5. FIG. 5 presents an exploded view of the attachment of a towel sample to an abrading table 202. To insert each sample to be tested in an abrading table, the motion plate 204 of an abrading table was removed from the tester, a clamp ring 214 was unscrewed, a piece of smooth polymer film 210 was placed on the abrading table 202, and a towel sample 212 was then placed on top of the smooth polymer film 210. A loading weight 215, shown in FIG. 6, was temporarily placed on top of the sample 212 on the abrading table 202 to hold everything in place while the clamp ring 214 was reattached to abrading table 202 to hold the towel sample 212 in place.

Figure 7:
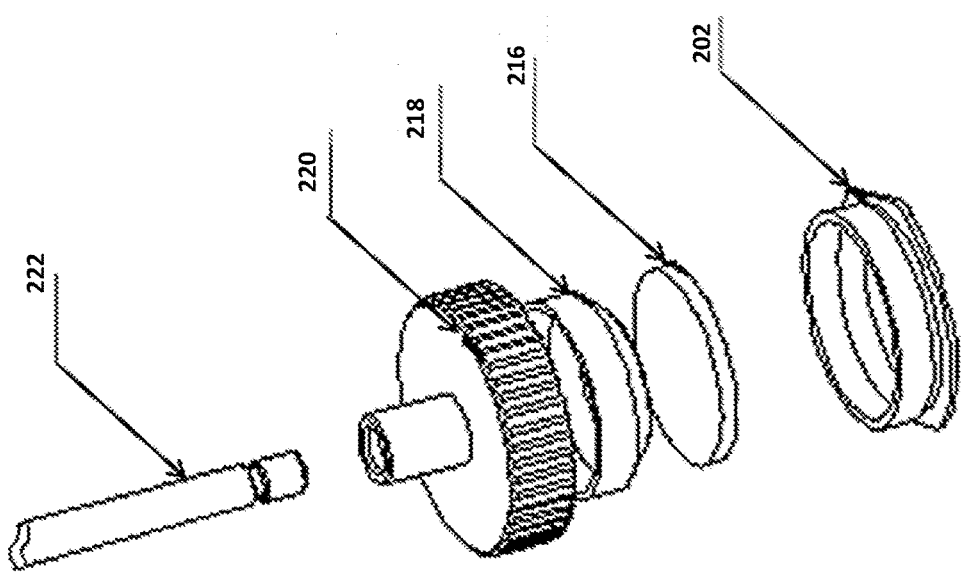
FIG. 7 is an exploded view of a specimen holder for abrasion testing towel samples in accordance with an embodiment of the present invention.

Referring to FIG. 7, for each abrading table 202 in the M235 tester, there is a corresponding specimen holder 206 to perform the abrasion testing. The specimen holder 206 was assembled by inserting a piece of the textured polymer film 216 within a specimen holder insert 218 that is placed beneath and held in place under a specimen holder body 220 with a specimen holder nut (not shown). A spindle 222 was mounted to the top center of the specimen holder body 206. A top view of the textured polymer film 216 of FIG. 7 is shown in FIG. 8.

The M235 tester was then turned on and set for a cycle time of 200 revolutions. 0.5 mL of water was placed on each towel sample. After a 30 second wait, the scrubbing test was initiated, thereby causing the specimen holder 206 to rotate 200 revolutions. The number of revolutions that it took to break each sample on the respective abrading table 202 (the "web scrubbing resistance" of the sample) was recorded. The results for the samples of each product were averaged and the products were then rated based on the averages.

Table 1 lists the results of abrasion tests performed on the indicated products, the dates on which the tests were performed, and the number of revolutions that the respective product remained intact before it broke. Table 1 also lists the basis weight of each product that was calculated according to the basis weight test described above.

TABLE 1

Paper Towel Wet Scrub and Basis Weight Testing

| Date | Product Name | Wet Scrub Revolutions | Basis Weight g/m 2 |
|---|---|---|---|
| Mar. 20, 2014 | Bounty Duratowel ® | 244 | 62 |
| May 19, 2014 | Bounty Duratowel ® | 82 | 62 |
| Aug. 5, 2014 | Bounty Duratowel ® | 200 | 62 |
| Jun. 1, 2014 | Example # 1 | 130 | 39 |
| Mar. 20, 2014 | Viva Vantage ® | 13 | 61 |
| May 19, 2014 | Bounty Basic ® | 73 | 36-38 |
| May 19, 2014 | Wegmans ® | 26 | 44 |
| May 19, 2014 | Weis ™ | 8 | 42-43 |
| May 19, 2014 | Up & Up ® - Target | 22 | 43-45 |
| May 30, 2014 | Up & Up ® - Target | 29 | 43-45 |
| Aug. 5, 2014 | Up & Up ® - Target | 68 | 43-45 |
| May 19, 2014 | Brawny ® | 7 | 46-50 |
| Aug. 5, 2014 | Brawny ® | 39 | 46-50 |
| May 30, 2014 | Great Value ™ | 23 | 42-44 |
| May 30, 2014 | Members Mark ® - Walmart | 33 | 43 |
| May 30, 2014 | Kirkland Signature ® Costco | 34 | 40-41 |
| Aug. 5, 2014 | Kirkland Signature ® Costco | 43 | 40-41 |
| May 30, 2014 | Safeway S ® | 17 | 44-45 |
| Aug. 5, 2014 | Sparkle ® | 36 | 44-46 |
| May 19, 2014 | Bounty ® | 60 | 47-50 |
| May 19, 2014 | Bounty ® | 42 | 47-50 |
| May 30, 2014 | Bounty ® | 62 | 47-50 |
| Aug. 5, 2014 | Bounty Extra Soft ® | 62 | 55-57 |

It is apparent from the test results that the present invention achieves a laminate with superior web scrubbing resistance of greater than 120 revolutions while maintaining a relatively low basis weight, such as a basis weight approximately at or below 50 g/m$^2$ and preferably at a basis weight at or above 30 g/m$^2$.

Moreover, the multi-ply absorbent product of the present invention is strong and has excellent absorptive properties. Various additional tests can be performed to verify the superior absorptive properties and strength of the laminate formed by the present invention. They include ball burst testing, stretch & MD, CD and wet CD tensile strength testing, caliper testing and absorbency testing.

Ball Burst Testing

The Ball Burst of a 2-ply tissue web was determined using a Tissue Softness Analyzer (TSA), available from emtec Electronic GmbH of Leipzig, Germany using a ball burst head and holder. A punch was used to cut out five 100 cm$^2$ round samples from the web. One of the samples was loaded into the TSA, with the embossed surface facing down, over the holder and held into place using the ring. The ball burst algorithm was selected from the list of available softness testing algorithms displayed by the TSA. The ball burst head was then pushed by the TSA through the sample until the web ruptured and calculated the grams force required for the rupture to occur. The test process was repeated for the remaining samples and the results for all the samples were averaged.

Stretch & MD, CD, and Wet CD Tensile Strength Testing

An Instron 3343 tensile tester, manufactured by Instron of Norwood, Mass., with a 100N load cell and 25.4 mm rubber coated jaw faces was used for tensile strength measurement. Prior to measurement, the Instron 3343 tensile tester was calibrated. After calibration, 8 strips of 2-ply product, each 2.54 cm by 10.16 cm (one inch by four inches), were provided as samples for each test. When testing MD (Material Direction) tensile strength, the strips are cut in the MD direction. When testing CD (Cross Direction) tensile strength, the strips are cut in the CD direction. One of the sample strips was placed in between the upper jaw faces and clamp, and then between the lower jaw faces and clamp with a gap of 5.08 cm (2 inches) between the clamps. A test was run on the sample strip to obtain tensile strength and stretch. The test procedure was repeated until all the samples were tested. The values obtained for the eight sample strips were averaged to determine the tensile strength of the tissue. When testing CD wet tensile, the strips are placed in an oven at 105 degrees Celsius for 5 minutes and saturated with 75 microliters of deionized water immediately prior to pulling the sample.

Caliper Testing

A Thwing-Albert ProGage 100 Thickness Tester, manufactured by Thwing Albert of West Berlin, N.J. was used for the caliper test. Eight 100 mm×100 mm square samples were cut from a 2-ply product. The samples were then tested individually and the results were averaged to obtain a caliper result for the base sheet.

Absorbency Testing

An absorbency test may also be run to determine absorption characteristics of the product. One such test may be performed using a Gravimetric Absorption Testing System (GATS) from M/K Systems Inc. of Peabody, Mass. In this test, a sample is wet with a liquid, generally water, and the testing equipment records the mass of liquid that is absorbed as time progresses. This test may be run with 100 cm$^2$ samples.

The effectiveness of the lamination method of the present invention to achieve previously unattainable levels of scrubbing performance at particularly low basis weights is illustrated by the following example.

Example #1

A paper towel made on a wet-laid asset with a three layer headbox was produced using the through air dried (TAD) method. The paper towel was dried on a TAD fabric, Prolux 593, supplied by Albany International of Rochester, N.H. The TAD fabric was a 13 shed design with 12.0 yarn/cm Mesh and Count, a 0.35 mm warp monofilament, a 0.50 mm weft monofilament, a 1.29 mm caliper, with a 670 cubic feet per minute (cfm) and a knuckle surface that is sanded to impart 12% contact area with the yankee dryer. The air layer 4, or outer layer, of the finished tissue was placed on the TAD fabric, while the dry layer of the tissue was closest to the surface of the Yankee dryer. The flow to each layer of the headbox was maintained at about 33% of the total sheet.

The tissue was produced with approximately 20% eucalyptus, 15% Cannabis bast fiber, and 65% northern bleached softwood kraft (NBSK) fibers. The Yankee layer fiber was approximately 50% eucalyptus, 50% NBSK. Polyamine polyamide-epichlorohydrin resin at 10 kg/ton (dry basis) and 4 kg/ton (dry basis) of carboxymethyl cellulose were added to each of the three layers to generate permanent wet strength.

Using the method described above with reference to FIG. 3, the towel was plied together as a laminate of the two tissues to create a rolled 2-ply product with 142 sheets, a roll diameter of 142 mm, with sheets having a length of 15.24 cm (6.0 inches) and width of 27.94 cm (11 inches). The 2-ply tissue product was found to have approximately the following product attributes: a Basis Weight of 39 g/m2, a Caliper of 0.850 mm, an MD tensile of 385 N/m, a CD tensile of 365 N/m, a ball burst of 820 grams force, an MD stretch of 18%, a CD stretch of 6%, a CD wet tensile of 105 N/m, an absorbency of 750 gsm (grams per square meter) and a Wet Scrubbing resistance of 130 revolutions.

Now that embodiments of the present invention have been shown and described in detail, various modifications and improvements thereon will become readily apparent to those skilled in the art. Accordingly, the spirit and scope of the present invention is to be construed broadly and not limited by the foregoing specification.

What is claimed is:

1. A method for laminating at least two fibrous plies together to form a multi-ply absorbent fibrous product, the method comprising:
    (a) embossing at least two fibrous plies;
    (b) applying a heated adhesive to an interior side of at least one of the at least two fibrous plies to adhere the at least two fibrous plies together, wherein the interior side is a side of a ply that comes into a face-to-face relationship with another ply for lamination and wherein the adhesive is heated prior to being applied; and
    (c) marrying the at least two fibrous plies that have been embossed after the heated adhesive has been applied; whereby a laminate of the at least fibrous two plies is obtained, and the laminate has a wet scrubbing resistance greater than 120 revolutions and a basis weight of between 30 and 50 grams per square meter.

2. The laminating method of claim 1, wherein the step of embossing is performed using embossing rolls, the embossing rolls having a plurality of embossing knobs with crests thereon, and wherein the heated adhesive is applied with an adhesive applicator roll to the absorbent product at the crests of the embossing knobs.

3. The laminating method of claim 1, wherein the applied adhesive comprises a water soluble adhesive mixture comprised of
    (a) between approximately 1% to 10% by weight of polyvinyl alcohol, polyvinyl acetate, starch based resins or mixtures thereof, and (b) between 80% to 99% by weight of water;
    wherein the water soluble adhesive mixture applied to at least one ply of the at least two fibrous plies of absorbent product at a temperature of between approximately 32 degrees C. to 66 degrees C.

4. The laminating method of claim 1, wherein the water soluble adhesive mixture further comprises up to 10% by weight of a water soluble cationic resin selected from the group consisting of polyamide-epichlorohydrin resins, glyoxalated polyacrylamide resins, polyethyleneimine resins, polyethylenimine resins, or mixtures thereof.

5. The laminating method of claim 1, wherein, before being applied, the heated adhesive is maintained at a temperature of between approximately 32 degrees C. to 66 degrees C. in an insulated tank.

6. The laminating method of claim 1, wherein each of the at least two plies comprises an embossed area, wherein the embossed area occupies between approximately 5 to 15% of the total surface area of a surface of the ply.

7. The laminating method of claim 1, wherein each of the at least two plies comprises an embossed area having a surface, wherein a depth of embossment of the surface is between approximately 0.28 and 0.43 centimeters.

8. The laminating method of claim 1, wherein each of the at least two plies comprises an embossed area having a surface, wherein each embossment of the surface is between approximately 0.04 and 0.08 square centimeters in size.

9. The laminating method of claim 1, further comprising the step of agitating the heated adhesive prior to application.

10. The laminating method of claim 1, wherein the absorbent product is one of a paper towel, a disposable towel or wipe, a bath or facial tissue, or a nonwoven product.

11. The laminating method of claim 1, wherein at least one of the at least two plies comprises cellulosic-based fibers.

12. The laminating method of claim 11, wherein the cellulosic-based fibers are comprised of one or more of wood pulp, cannabis, cotton, regenerated or spun cellulose, jute, flax, ramie, bagasse, or kenaf fibers.

13. The laminating method of claim 1, wherein at least one of the at least two plies comprises synthetic fibers.

14. The laminating method of claim 13, wherein the synthetic fibers are comprised of one or more of a polyolefin, polyester or polylactic acid.

15. The laminating method of claim 1, wherein at least one of the at least two plies comprises synthetic fibers and at least a second of the at least two plies comprises cellulosic based fibers.

16. The laminating method of claim 1, wherein at least one of the at least two plies is produced using an air-laid process.

17. The laminating method of claim 1, wherein at least one of the at least two plies is produced using a wet-laid process.

* * * * *